(12) United States Patent
Fu et al.

(10) Patent No.: US 11,580,622 B2
(45) Date of Patent: Feb. 14, 2023

(54) SYSTEM AND METHOD FOR IMAGE INPAINTING

(71) Applicant: Fudan University, Shanghai (CN)

(72) Inventors: Yanwei Fu, Shanghai (CN); Chenjie Cao, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/694,687

(22) Filed: Mar. 15, 2022

(65) Prior Publication Data

US 2022/0292651 A1 Sep. 15, 2022

(30) Foreign Application Priority Data

Mar. 15, 2021 (CN) .......................... 202110274795.5

(51) Int. Cl.
| | | |
|---|---|---|
| G06T 5/00 | (2006.01) | |
| G06T 7/12 | (2017.01) | |
| G06T 5/30 | (2006.01) | |
| G06T 7/13 | (2017.01) | |

(52) U.S. Cl.
CPC ................ G06T 5/005 (2013.01); G06T 5/30 (2013.01); G06T 7/12 (2017.01); G06T 7/13 (2017.01); *G06T 2207/20016* (2013.01); *G06T 2207/20084* (2013.01); *G06T 2207/20192* (2013.01)

(58) Field of Classification Search
CPC ........... G06T 5/005; G06T 2207/20081; G06T 2207/20084; G06T 7/13; G06T 7/181; G06T 2207/20016; G06T 2207/20192; G06T 5/30; G06T 7/12; G06N 3/02–088
See application file for complete search history.

(56) References Cited

U.S. PATENT DOCUMENTS

| | | | |
|---|---|---|---|
| 2019/0287283 A1* | 9/2019 | Lin | ......................... G06T 11/60 |
| 2021/0125313 A1* | 4/2021 | Bai | ...................... G06K 9/6272 |
| 2021/0209797 A1 | 7/2021 | Lee | |

FOREIGN PATENT DOCUMENTS

WO   WO-2020038207 A1 * 2/2020 ............. G06T 5/005

OTHER PUBLICATIONS

Liao, Liang, et al. "Edge-aware context encoder for image inpainting." 2018 IEEE International Conference on Acoustics, Speech and Signal Processing (ICASSP). IEEE, 2018. (Year: 2018).*
(Continued)

*Primary Examiner* — Geoffrey E Summers
(74) *Attorney, Agent, or Firm* — Brad Bertoglio; Intelink Law Group, P.C.

(57) ABSTRACT

A system for image inpainting is provided, including an encoder, a decoder, and a sketch tensor space of a third-order tensor; wherein the encoder includes an improved wireframe parser and a canny detector, and a pyramid structure sub-encoder; the improved wireframe parser is used to extract line maps from an original image input to the encoder, the canny detector is used to extract edge maps from the original image, and the pyramid structure sub-encoder is used to generate the sketch tensor space based on the original image, the line maps and the edge maps; and the decoder outputs an inpainted image from the sketch tensor space. A method thereof is also provided.

15 Claims, 5 Drawing Sheets
(5 of 5 Drawing Sheet(s) Filed in Color)

(56) References Cited

OTHER PUBLICATIONS

Nazeri, Kamyar, et al. "EdgeConnect: Structure Guided Image Inpainting using Edge Prediction." 2019 IEEE/CVF International Conference on Computer Vision Workshop (ICCVW). IEEE, 2019. (Year: 2019).*
Shao, Hang, et al. "Generative image inpainting via edge structure and color aware fusion." Signal Processing: Image Communication 87 (2020): 115929. (Year: 2020).*
Xu, Shunxin, Dong Liu, and Zhiwei Xiong. "E2I: Generative inpainting from edge to image." IEEE Transactions on Circuits and Systems for Video Technology 31.4 (2020): 1308-1322. (Year: 2020).*
Xue, Nan, et al. "Holistically-Attracted Wireframe Parsing." arXivpreprint arXiv:2003.01663v1 (2020). (Year: 2020).*
Yang, Jie, Zhiquan Qi, and Yong Shi. "Learning to Incorporate Structure Knowledge for Image Inpainting." arXiv preprint arXiv:2002.04170v2 (2020). (Year: 2020).*
Yu, Jiahui, et al. "Free-Form Image Inpainting With Gated Convolution." 2019 IEEE/CVF International Conference on Computer Vision (ICCV). IEEE. (Year: 2019).*
Hang Shao, Yongxiong Wang, Yinghua Fu, Zhong Yin; Signal Processing: Image Communication; El Sevier; 2020 Elsevier B.V.; pp. 1-9.
Zhe Cao, Yaser Sheikh, Natasha Kholgade Banerjee; Real-time scalable 6DOF pose estimation for textureless objects; 2016 IEEE International Conference on Robotics and Automation (ICRA) Stockholm, Sweden, May 16-21, 2016; pp. 2441-2448.
Chang et al.; ShapeNet: An Information-Rich 3D Model Repository; http://www.shapenet.org; arXiv:1512.03012v1 [cs.GR] Dec. 9, 2015; pp. 1-11.
Christopher Funk et al.; 2017 ICCV Challenge: Detecting Symmetry in the Wild; 2017 IEEE International Conference on Computer Vision Workshops; IEEE DOI 10.1109/ICCVW.2017.198; pp. 1692-1701.
Kaiming He, Georgia Gkioxari, Piotr Dollar, Ross Girshick; Mask R-CNN; Computer Vision Foundation; pp. 2961-2969.
Yisheng He et al.; PVN3D: A Deep Point-wise 3D Keypoints Voting Network for 6DoF Pose Estimation; 2020 Computer Vision Foundation; pp. 11632-11641.
Stefan Hinterstoisser et al.; Model Based Training, Detection and Pose Estimation of Texture-Less 3D Objects in Heavily Cluttered Scenes; pp. 1-14.
Zitian Huang, Yikuan Yu, Jiawen Xu, Feng Ni, Xinyi Le; PF-Net: Point Fractal Network for 3D Point Cloud Completion; 2020 Computer Vision Foundation; pp. 7662-7670.
Jarmo Iionen, Jeannette Bohg, Ville Kyrki; Three-dimensional object reconstruction of symmetric objects by fusing visual and tactile sensing; The International Journal of Robotics Research; 2014 33: 321 originally published online Oct. 1, 2013; DOI: 10.1177/0278364913497816; Published by: SAGE; http://www.sagepublications.com; pp. 321-344.
Mex Kendall et al.; PoseNet: A Convolutional Network for Real-Time 6-DOF Camera Relocalization; 2015 IEEE International Conference on Computer Vision; DOI 10.1109/ICCV.2015.336; pp. 2938-2946.
Nilesh Kulkarni et al; Canonical Surface Mapping via Geometric Cycle Consistency; 1907.10043v2 [cs.CV] Aug. 15, 2019; pp. 16.
Vincent Lepetit et al.; EPnP: An Accurate O(n) Solution to the PnP Problem; Int J Comput Vis DOI 10.1007/s11263-008-0152-6; Springer Science+Business Media, LLC 2008; pp. 12.
Yan Li, Leon Gu, Takeo Kanade; Robustly Aligning a Shape Model and Its Application to Car Alignment of Unknown Pose; IEEE Transactions On Pattern Analysis and Machine Intelligence, vol. 33, No. 9, Sep. 2011, pp. 1860-1876.
David G. Lowe; Object Recognition from Local Scale-Invariant Features; IEEE Xplore; pp. 8.

Rajendra Nagar, Shanmuganathan Raman; Reflection Symmetry Axes Detection Using Multiple Model Fitting; IEEE Signal Processing Letters, vol. 24, No. 10, Oct. 2017; pp. 1438-1442.
Sida Peng et al.; PVNet: Pixel-wise Voting Network for 6DoF Pose Estimation; Computer Vision Foundation; pp. 4561-4570.
Charles R. Qi et al.; Deep Hough Voting for 3D Object Detection in Point Clouds; Computer Vision Foundation; pp. 9277-9286.
Caner Sahin et al.; Instance- and Category-level 6D Object Pose Estimation; arXiv:1903.04229v1 [cs.CV] Mar. 11, 2019. pp. 1-23.
Caner Sahin et al.; A Review on Object Pose Recovery: from 3D Bounding Box Detectors to Full 6D Pose Estimators; Electrical and Electronic Engineering Department, Imperial Computer Vision and Learning Lab (ICVL), Imperial College London, SW72AZ, UK; pp. 1-25.
Caner Sahin et al.; Category-level 6D Object Pose Recovery in Depth Images; arXiv:1808.00255v1 [cs.CV] Aug. 1, 2018; pp. 1-16.
Peter H. Schonemann; A Generalized Solution of the Orthogonal Procrustes Problem; Psychometrika-vol. 31, No. 1, Mar. 1966; pp. 1-10.
Chen Song et al.; HybridPose: 6D Object Pose Estimation under Hybrid Representations; arXiv: 2001.01869v4 [cs.CV] Oct. 16, 2020; pp. 17.
Chen Wang et al.; 6-PACK: Category-level 6D Pose Tracker with Anchor-Based Keypoints; 2020 IEEE International Conference on Robotics and Automation (ICRA) May 31-Aug. 31, 2020. Paris, France; pp. 10059-10066.
Chen Wang et al.; DenseFusion: 6D Object Pose Estimation by Iterative Dense Fusion; Computer Vision Foundation pp. 3343-3352.
Zhaozhong Wang et al.; Reflection Symmetry Detection Using Locally Affine Invariant Edge Correspondence; IEEE Transactions On Image Processing, vol. 24, No. 4, Apr. 2015; pp. 1297-1301.
Shangzhe Wu et al.; Unsupervised Learning of Probably Symmetric Deformable 3D Objects from Images in the Wild; 2020 Computer Vision Foundation; pp. 1-10.
Yu Xiang et al.; PoseCNN: A Convolutional Neural Network for 6D Object Pose Estimation in Cluttered Scenes; arXiv:1711.00199V3 [cs.CV] May 26, 2018; pp. 10.
Tianfan Xue et al.; Symmetric Piecewise Planar Object Reconstruction from a Single Image; IEEE Xplore; pp. 2577-2584.
Gu Wang et al.; Self6D: Self-Supervised Monocular 6D Object Pose Estimation; arXiv:2004.06468v3 [cs.CV] Aug. 23, 2020; pp. 1-27.
C. Barner, E. Shechtman, A. Finkelstein, D. Goldman; PatchMatch: A Randomized Correspondence Algorithm for Structural Image Editing. ACM Trans. Graph. 28, 3, Article 24 (Aug. 2009), 11 pages; DOI = 10.1145/1531326.1531330 http://doi.acm.org/10.1145/1531326.1531330.
A. Criminisi, P. Perez, K. Toyama; Object Removal by Exemplar-Based Inpainting; Proceedings of the 2003 IEEE Computer Society Conference on Computer Vision and Pattern Recognition (CVPR'03); pp. 1-8.
Y. Cui, M. Jia, T. Lin, Y. Song, S. Belongie; Class-Balanced Loss Based on Effective Number of Samples; Computer Vision Foundation; pp. 9268-9277.
P. Denis, J. H. Elder, and F. J. Estrada; Efficient Edge-Based Methods for Estimating Manhattan Frames in Urban Imagery; ECCV 2008, Part II, LNCS 5303, pp. 197-210, 2008.
L. Ding, A. Goshtasby; On the Canny edge detector; Pattern Recognition 34 (2001) 721-725; 2001 Pattern Recognition Society. Published by Elsevier Science Ltd.
Omar Elharrouss, Noor Almaadeed, Somaya Al-Maadeed, Younes Akbari; Image Inpainting: A Review; Neural Processing Letters (2020) 51:2007-2028; Published online: Dec. 6, 2019; https://doi.org/10.1007/s11063-019-10163-0.
Leon A. Gatys, Alexander S. Ecker, Matthias Bethge; Image Style Transfer Using Convolutional Neural Networks; Computer Vision Foundation; pp. 2414-2323.
Qiang Guo, Shanshan Gao, Xiaofeng Zhang, Yilong Yin, and Caiming Zhang; Patch-Based Image Inpainting via Two-Stage Low Rank Approximation; IEEE Transactions On Visualization and Computer Graphics, vol. 24, No. 6, pp. 2023-2036; Jun. 2018.

(56) References Cited

OTHER PUBLICATIONS

Richard O. Duda, Peter E. Hart; Use of the Hough Transformation To Detect Lines and Curves in Pictures; Association for Computing Machinery, Inc.; Communications of the ACM Jan. 1972 vol. 15 No. 1, pp. 11-15.
James Hays, Alexei A. Efros; Scene Completion Using Millions of Photographs; ACM Transactions on Graphics, vol. 26, No. 3, Article 4, pp. 8, Publication date: Jul. 2007.
Martin Heusel, Hubert Ramsauer, Thomas Unterthiner, Bernhard Nesseler, Sepp Hochreiter; GANs Trained by a Two Time-Scale Update Rule Converge to a Local Nash Equilibrium; pp. 12; 31st Conference on Neural Information Processing Systems (NIPS 2017), Long Beach, CA, USA.
Hongyu Liu, Bin Jiang, Yibing Song, Wei Huang, and Chao Yang; Rethinking Image Inpainting via a Mutual Encoder-Decoder with Feature Equalizations; Springer Nature Switzerland AG 2020, corrected publication 2020 A. Vedaldi et al. (Eds.): ECCV 2020, LNCS 12347, pp. 725-741, 2020.
Jia-Bin Huang, Sing Bing Kang, Narendra Ahuja, Johannes Kopf; Image Completion using Planar Structure Guidance; ACM Transactions on Graphics, vol. 33, No. 4, Article 129, pp. 10; Publication Date: Jul. 2014.
Kun Huang, Yifan Wang, Zihan Zhou, Tianjiao Ding, Shenghua Gao, and Yi Ma; Learning to ParseWireframes in Images of Man-Made Environments; Networks; Computer Vision Foundation; pp. 626-635.
Youngjoo Jo, Jongyoul Park; SC-FEGAN: Face Editing Generative Adversarial Network with User's Sketch and Color; Computer Vision Foundation; pp. 1745-1753.
Justin Johnson, Alexandre Alahi, Li Fei-Fei; Perceptual Losses for Real-Time Style Transfer and Super-Resolution; Department of Computer Science, Stanford University, Stanford, USA; Springer International Publishing AG 2016; B. Leibe et al. (Eds.): ECCV 2016, Part II, LNCS 9906, pp. 694-711, 2016; DOI: 10.1007/978-3-319-46475-643.
Avisek Lahiri, Arnav Kumar Jain, Sanskar Agrawal, Pabitra Mitra, Prabir Kumar Biswas; Prior Guided GAN Based Semantic Inpainting; Indian Institute of Technology Kharagpur, Microsoft; Computer Vision Foundation; pp. 13696-13705.
Cheng-Han Lee, Ziwei Liu, Lingyun Wu, Ping Luo; MaskGAN: Towards Diverse and Interactive Facial Image Manipulation; pp. 5549-5558.
Haodong Li, Weiqi Luo, Jiwu Huang; Localization of Diffusion-Based Inpainting in Digital Images; IEEE Transactions on Information Forensics and Security, vol. 12, No. 12, Dec. 2017, pp. 3050-3064.
Jingyuan Li, Fengxiang He, Lefei Zhang, Bo Du, Dacheng Tao; Progressive Reconstruction of Visual Structure for Image Inpainting; Computer Vision Foundation; pp. 5962-5971.
Jingyuan Li, Ning Wang, Lefei Zhang, Bo Du, Dacheng Tao; Recurrent Feature Reasoning for Image Inpainting Computer Vision Foundation; pp. 7760-7768.
Liang Liao, Jing Xiao, Zheng Wang, Chia-Wen Lin, Shin'ichi Satoh; Guidance and Evaluation: Semantic-Aware Image Inpainting for Mixed Scenes; Springer Nature Switzerland AG 2020; A. Vedaldi et al. (Eds.): ECCV 2020, LNCS 12372, pp. 683-700, 2020.
Tsung-Yi Lin, Michael Maire, Serge Belongie, James Hays, Pietro Deva Ramanan, Piotr Dollar, and C. Lawrence Zitnick; Microsoft COCO: Common Objects in Context; D. Fleet et al. (Eds.): ECCV 2014, Part V, LNCS 8693, pp. 740-755, Springer International Publishing Switzerland 2014.
Guilin Liu, Fitsum A. Reda, Kevin J. Shih, Ting-Chun Wang, Andrew Tao, Bryan Catanzaro; Image Inpainting for Irregular Holes Using Partial Convolutions; NVIDIA Corporation; Computer Vision Foundation 2018; pp. 16.
Hongyu Liu, Bin Jiang, Yi Xiao, Chao Yang; Coherent Semantic Attention for Image Inpainting; Computer Vision Foundation; pp. 4170-4179.
Xiaohu Lu, Jian Yaoy, Kai Li, and Li Li; Cannylines: A Parameter-Free Line Segment Detector; IEEE Xplore ICIP 2015; pp. 507-511.
Takeru Miyato, Toshiki Kataoka, Masanori Koyama, Yuichi Yoshida; Spectral Normalization for Generative Adversarial Networks; Published as a conference paper at ICLR 2018; arXiv:1802.05957v1 [cs.LG] Feb. 16, 2018.
Meng Tian et al., Shape Prior Deformation for Categorical 6DObject Pose and Size Estimation; National University of Singapore, Singapore; pp. 1-17.
Yurui Ren, Xiaoming Yu, Ruonan Zhang, Thomas H. Li, Shan Liu, Ge Li; StructureFlow: Image Inpainting via Structure-aware Appearance Flow; Computer Vision Foundation; pp. 10.
Patsorn Sangkloy, Jingwan Lu, Chen Fang, Fisher Yu, James Hays; Scribbler: Controlling Deep Image Synthesis with Sketch and Color; Computer Vision Foundation; pp. 5400-5409.
Shen Zhuoran, Zhang Mingyuan, Zhao Haiyu, Yi Shuai, Li Hongshen; Efficient Attention: Attention with Linear Complexities; WACV 2021; Computer Vision Foundation; pp. 3531-3539.
Yuhang Song, Chao Yang, Yeji Shen, Peng Wang, Qin Huang, C.C. Jay Kuo; SPG-Net: Segmentation Prediction and Guidance Network for Image Inpainting; pp. 1-14; arXiv:1805.03356v4 [cs.CV] Aug. 6, 2018.
Vaswani et al.; Attention Is All You Need; 31st Conference on Neural Information Processing Systems (NIPS 2017), Long Beach, CA, USA; pp. 11.
Rafael Grompone von Gioi, Je' re'mie Jakubowicz, Jean-Michel Morel, and Gregory Randall; LSD: A Fast Line Segment Detector with a False Detection Control; IEEE Transactions On Pattern Analysis and Machine Intelligence, vol. 32, No. 4, Apr. 2010; pp. 722-732.
Ting-Chun Wang, Ming-Yu Liu, Jun-Yan Zhu, Andrew Tao, Jan Kautz, Bryan Catanzaro; High-Resolution Image Synthesis and Semantic Manipulation with Conditional GANs; Computer Vision Foundation; pp. 8798-8807.
Zhou Wang, Alan Conrad Bovik, Hamid Rahim Sheikh, Eero P. Simoncelli; Image Quality Assessment: From Error Visibility to Structural Similarity; IEEE Transactions On Image Processing, vol. 13, No. 4, Apr. 2004; pp. 600-612.
Wei Xiong, Jiahui Yu, Zhe Lin, Jimei Yang, Xin Lu, Connelly Barnes, Jiebo Luo; Foreground-aware Image Inpainting; Computer Vision Foundation; pp. 5840-5848.
He Wang et al.; Normalized Object Coordinate Space for Category-Level 6D Object Pose and Size Estimation; Computer Vision Foundation; pp. 2642-2651.
Dengsheng Chen et al.; Learning Canonical Shape Space for Category-Level 6D Object Pose and Size Estimation; 2020 Computer Vision Foundation; pp. 11973-11982.
Zili Yi Qiang, Tang Shekoofeh, Azizi Daesik, Jang Zhan Xu; Contextual Residual Aggregation for Ultra High-Resolution Image Inpainting; Computer Vision Foundation 2020; pp. 7508-7517.
Fisher Yu, Vladlen Koltun; Multi-Scale Context Aggregation by Dilated Convolutions; Published as a conference paper at ICLR 2016; arXiv: 1511.07122v3 [cs.CV] Apr. 30, 2016; pp. 1-13.
Jiahui Yu, Zhe Lin, Jimei Yang Xiaohui Shen, Xin Lu, Thomas S. Huang; Generative Image Inpainting with Contextual Attention; Computer Vision Foundation; pp. 5505-5514.
Fabian Manhardt et al.; CPS++: Improving Class-level 6D Pose and Shape Estimation From Monocular Images With Self-Supervised Learning; arXiv: 2003.05848v.3[cs.CV] Sep. 11, 2020; pp. 1-18.
Yanhong Zeng, Jianlong Fu, Hongyang Chao, Baining Guo; Learning Pyramid-Context Encoder Network for High-Quality Image Inpainting; Computer Vision Foundation; pp. 1486-1494.
Yu Zeng, Zhe Lin, Jimei Yang, Jianming Zhang, Eli Shechtman, Huchuan Lu; High-Resolution Image Inpainting with Iterative Confidence Feedback and Guided Upsampling; Springer Nature Switzerland AG 2020; A. Vedaldi et al. (Eds.): ECCV 2020, LNCS 12364, pp. 1-17, 2020.
Richard Zhang, Phillip Isola, Alexei A. Efros, Eli Shechtman, Oliver Wang; The Unreasonable Effectiveness of Deep Features as a Perceptual Metric; Computer Vision Foundation; pp. 586-595.
Richard Zhang, Jun-yan Zhu, Phillip Isola, Xinyang Geng, Angela S. Lin, Tianhe Yu, Alexei A. Efros; Real-Time User-Guided Image Colorization with Learned Deep Priors; ACM Transactions on Graphics, https://doi.org/http://dx.doi.org/10.1145/3072959.3073703.

(56) References Cited

OTHER PUBLICATIONS

Bolei Zhou, Agata Lapedriza, Aditya Khosla, Aude Oliva, Antonio Torralba; Places: A 10 Million Image Database for Scene Recognition; IEEE Transactions On Pattern Analysis and Machine Intelligence, vol. 40, No. 6, pp. 1452-1464; Jun. 2018.

Yichao Zhou, Haozhi Qi, Yi Ma; End-to-EndWireframe Parsing; Computer Vision Foundation; pp. 962-971.

Shunxin Xu, Dong Liu, Zhiwei Xiong; E2I: Generative Inpainting From Edge to Image; IEEE Transcations on Circuits and Systems for Video Technology, vol. 31, No. 4. pp. 1308-1322; Apr. 2021.

\* cited by examiner

(a) input  (b) Ours w/o lines  (c) Ours w/o PDS  (d) Ours  (e) Ground Truth

Fig. 8

SYSTEM AND METHOD FOR IMAGE INPAINTING

RELATED APPLICATIONS

The present patent application claims priority of China patent application No. 202110274795.5 filed on Mar. 15, 2021, the entire content of which is hereby incorporated by reference.

TECHNICAL FIELD

This invention is related to a network for Image Inpainting, and more particularly, for a network for image inpainting of man-made scenes. This invention is also related to a system and a method thereof.

BACKGROUND

It is very challenging due to the difficulty in preserving the visual patterns of images, such as edges, lines, and junctions. Especially, most previous works are failed to re-store the object/building structures for images of man-made scenes.

As the long-standing problem, image inpainting has been studied to address the problem of filling in the missing parts of the images being semantically consistent and visually realistic with plausible results. Thus, image inpainting is useful to many real-world applications, e.g. image restoration, image editing, and object removal (Elharrouss et al., "Image inpainting: A review", *Neural Processing Letters*, 2019).

Intrinsically as an inverse problem, the inpainting is challenging in both restoring the missed global structure (semantically consistent), and generating realistic regions locally coherent to unmasked regions (visually consistent). Especially, it is hard to reconstruct the missed image regions from the complex man-made scenes and structures, due to the difficulty in preserving the prominent low-level visual patterns, such as edges, line segments, and junctions.

Both traditional approaches and deep learning methods had made great efforts on reconstructing the structures of images in producing visually realistic results. However, these methods are still challenged by producing structurally coherent results, especially in the inpainting of man-made scenes.

Figure 1:
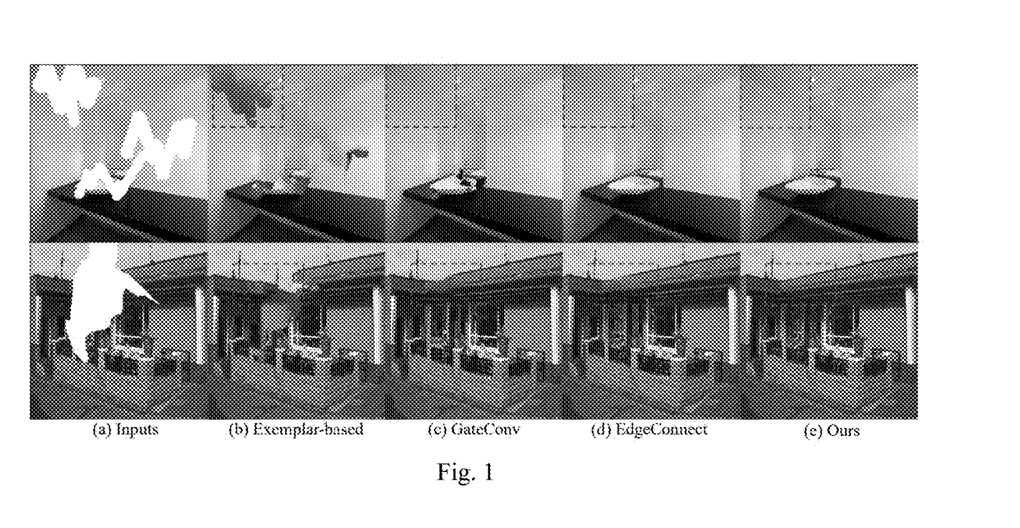
FIG. 1 illustratively shows the results of some prior art methods, as well as that of the present embodiments.

FIG. 1 illustratively shows the results of some prior art methods, with the inpainted areas highlighted by red dot box. From column b to d, it respectively shows the results of Exemplar-based inpainting (Criminisi et al., "Object removal by exemplar-based inpainting", *IEEE Computer Society Conference on Computer Vision and Pattern Recognition*, 2003), GateConv (Yu et al, "Free-form image inpainting with gated convolution", *IEEE International Conference on Computer Vision*, 2019), and EdgeConnect (Nazeri et al., "Edgeconnect: Structure guided image inpainting using edge prediction", *IEEE/CVF International Conference on Computer Vision (ICCV) Workshops*, 2019).

Typically, inpainting approaches may suffer from the following problems.

(1) Missing critical structures. Traditional synthesis-based approaches are normally unable to model the critical structures as in FIG. 1(col. b). On the other hand, recent learning-based inpainting methods utilize auxiliary information to support the inpainting, e.g., edges, and segmentation, pre-dominantly inpainting local visual cues, rather than holistic structures of man-made scenes. For example, the results of EdgeConnect with canny edges (Ding et al., "On the canny edge detector". *Pattern Recognition*, 2001.) in FIG. 1 (col. d) suffer from broken and blurry line segments and lose connectivity of building structures.

(2) Unreliable pattern transfer. The learning-based auxiliary detectors will transfer and magnify the unreliable image priors or patterns to the masked image regions, which causes degraded inpainting results (Liao et al., "Guidance and evaluation: Semantic-aware image inpainting for mixed scenes", *Computer Vision-ECCV 2020: 16th European Conference"*, 2020).

(3) Trading off performance and efficiency. The auxiliary-based inpainting methods usually consume more computation, due to additional components or training stages. But these methods still have artifacts in junction regions as framed with red dotted lines in FIG. 1 (col. c and d). Therefore, the design of a more effective network is expected to efficiently enhance the inpainting performance.

The auxiliary information of semantics and structures have been utilized to help inpainting tasks in traditional methods, such as lines, structures, and approximation images (Hays et al., "Scene completion using millions of photographs", *Communications of the ACM*, 2008.). Recently, deep learning-based approaches take auxiliary information as the important prior, such as canny edges, smoothed edges, edge and gradient information (Yang et al, "Learning to incorporate structure knowledge for image inpainting", *AAAI*, 2020), and semantic segmentation. Auxiliary information has been also utilized in image editing. Particularly, EdgeConnect and GateConv both leverage edges to inpaint masked areas with specific structural results. However, there is no holistic structure information for man-made scenes that has been explicitly modeled and utilized as auxiliary information in previous work. Such information is crucial to inpaint the images of complex structures, such as buildings, or indoor furniture. To this end, our method utilizes the separability and connectivity of line segments to help improve the performance of inpainting.

Line detection approaches enjoy immense value in many real-world problems. Therefore, they have been widely researched and developed in computer vision. Many classic graphics algorithms are proposed to extract line segments from raw images. However, these traditional methods suffer from intermittent and spurious line segments. Moreover, the extracted lines lack positions of junctions which causes poor connectivity. Huang et al. ("Learning to parse wireframes in images of man-made environments", *IEEE Conference on Computer Vision and Pattern Recognition*, 2018) propose a deep learning based wireframe parsing to improve the line detection task, which uses DNNs to predict heat maps of junctions and line segments as the wireframe representation. Zhou et al. ("End-to-end wireframe parsing", *IEEE International Conference on Computer Vision*, 2019) proposed in a LCNN which leverages heuristic sampling strategies and a line verification network to improve the performance of wireframe parsing. Furthermore, Xue et al. ("Holistically attracted wireframe parsing" (HAWP), *IEEE/CVF Conference on Computer Vision and Pattern Recognition*, 2020) utilize the holistic attraction field to enhance both efficiency and accuracy for the wire-frame parser. Although wireframe parsing based models enjoy distinctive strengths, to the best of our knowledge, no previous work has considered utilizing wireframe parser to help preserve line structures for down-streaming inpainting task. Critically, for the first time, our method first repurposes the wireframe parser to facilitate image inpainting, which leverages connectivity and structural information of wireframes to achieve better inpainting performance.

In sum, there is a need to provide a new and different mechanism for image inpainting of man-made scenes.

SUMMARY

To this end, this paper particularly focuses on learning to reconstruct these visual patterns for image inpainting, and proposes a method of the best merits in repairing the masked regions of man-made scene images, such as images with indoor and outdoor buildings.

Our key idea is to learn a Sketch Tensor (ST) space by an encoder-decoder model.

(1) The encoder learns to infer both local and holistic critical structures of input images, including canny edges and compositional lines. The image is encoded as the binarized 'sketch' style feature maps, dubbed as sketch tensor. The decoder takes the restored structure to fill in holes of images.

(2) For the first time, the idea of parsing wireframes is re-purposed to facilitate inpainting by strengthening the holistic structures of man-made scenes with more effective and flexible holistic structures. We propose a Line Segment Masking (LSM) algorithm to effectively train the wireframe parser, which alleviates unreliable structure guidance from corrupted images and the heavy computation of auxiliary detectors during the training phase. Besides, LSM also leverage the separability of line segments to extend the pro-posed model to obtain better object removal results.

(3) Most importantly, we significantly boost the training and inference process of previous inpainting architectures. Thus, a series of efficient modules are proposed, which include partially gated convolutions, efficient attention module, and Pyramid Decomposing Separable (PDS) blocks. Critically, we present PDS blocks to help better learn binary line and edge maps. Our proposed modules make a good balance of model performance and training efficiency.

Formally, this paper proposes a novel Multi-scale Sketch Tensor inpainting (MST) network with an encoder-decoder structure. The encoder employs LSM algorithm to train an hourglass wireframe parser (HAWP) and a canny detector to extract line and edge maps. These maps concatenated with input images are projected into ST space by Pyramid Structure Sub-encoder (PSS), which is sequentially constructed by 3 partially gated convolution layers, 8 dilated residual block layers with an efficient attention module, and 3 pyramid decomposing block layers. The image is encoded as a third-order sketch tensor in ST space, representing local and holistic structures. Finally, the decoder is stacked by two groups of 3 partially gated convolution layers for both ends with 8 residual block layers, which will re-project the sketch tensor into the restored image.

In one aspect of this invention, it is provided a system for image inpainting, including an encoder, a decoder, and a sketch tensor space of a third-order tensor; wherein the encoder includes an improved wireframe parser and a canny detector, and a pyramid structure sub-encoder;

the improved wireframe parser is used to extract line maps from an original image input to the encoder, the canny detector is used to extract edge maps from the original image, and the pyramid structure sub-encoder is used to generate the sketch tensor space based on the original image, the line maps and the edge maps; and the decoder outputs an inpainted image from the sketch tensor space.

Preferably, the improved wireframe parser extracts the junction set and line set paired by the junctions of the junction set.

Preferably, when lines are corrupted by a mask, a line segment masking (LSM) algorithm is used to infer missed line segments with a flexible wireframe parsing.

Preferably, the flexible wireframe parsing includes learning an LSM-HAWP network by retraining holistically attracted wireframe parsing (HAWP) with the irregular and object segmentation masks, and introducing an indicator function to denote the masking probability of each line segment according to the mask as the post-processing of LSM-HAWP.

Preferably, during the post-processing of LSM-HAWP, only in inpainting training process or object removal task, the ground-truth images are known in advance.

Preferably, all wireframes are extracted beforehand and filtered by the post-process of LSM-HAWP, rather than an end-to-end training with LSM-HAWP.

Preferably, edge maps are binary maps.

Preferably, line maps are got from connecting junction pairs from LSM-HAWP with anti-aliased lines.

Preferably, the pyramid structure sub-encoder includes partially gated convolutions blocks, dilated residual blocks, an efficient attention block, and pyramid decomposing separable blocks.

Preferably, in the partially gated convolutions (GC) blocks only three GC layers are used for the input and output features in both upsampling and downsampling parts.

Preferably, the efficient attention block is in the middle of pyramid structure sub-encoder.

Preferably, the pyramid decomposing separable blocks leverages dilated lower-scale structures.

Preferably, the pyramid decomposing separable blocks project the image feature into two separated embedding spaces; one is a line embedding space and the other is an edge embedding space.

Preferably, the decoder includes partially gated convolutions blocks, dilated residual blocks, without efficient attention blocks or pyramid decomposing separable blocks.

In another aspect of this invention, it is provided a method for image inpainting, including the steps of extracting line maps from an original image;

extracting edge maps from the original image;

generating a sketch tensor space based on the original image, the line maps and the edge maps; and outputting an inpainted image from the sketch tensor space.

Preferably, extracting line maps includes extracting the junction set and line set paired by the junctions of the junction set.

In yet another aspect of this invention, it is provided a system for image inpainting, including an encoder and a decoder;

wherein the encoder includes an improved wireframe parser and a canny detector, and a pyramid structure sub-encoder;

the improved wireframe parser is used to extract line maps from an original image input to the encoder, the canny detector is used to extract edge maps from the original image, and the pyramid structure sub-encoder is used to generate a sketch tensor space of a third-order tensor based on the original image, the line maps and the edge maps; and the decoder outputs an inpainted image from the sketch tensor space.

In general, this invention at least has the advantages as follows:

(1) We propose learning a novel sketch tensor space for inpainting tasks. Such a space is learned to restore the critical missed structures and visual patterns, and makes reliable predictions of the holistic image structures. Essentially, the sketch tensor has good interpretability of input images, as empirically shown in experiments.

(2) For the first time, the wireframe parsing has been re-purposed to extract lines and junctions for inpainting. A novel line segment masking algorithm is proposed to facilitate training our inpainting wireframe parser.

(3) We introduce the novel partially gated convolution and efficient attention module to significantly improve model performance without incurring additional expensive computational cost than competitors, such as EdgeConnect.

(4) A novel pyramid decomposing separable block is pro-posed to address the issue of effectively learning sparse binary edge and line maps.

(5) Extensive experiments on the dataset of both man-made and natural scenes, including ShanghaiTech (Huang et al, "Learning to parse wireframes in images of man-made environments", *Proceedings of the IEEE Conference on Computer Vision and Pattern Recognition,* 2018), Places2 (Zhou et al, "Places: A 10 million image database for scene recognition", *IEEE transactions on pattern analysis and machine intelligence,* 2017), and York Urban (Denis et al., "Efficient edge-based methods for estimating manhattan frames in urban imagery", *European conference on computer vision,* 2008). The efficacy of our MST-net is over the competitors.

BRIEF DESCRIPTION OF DRAWINGS

The patent or application file contains at least one drawing executed in color. Copies of this patent or patent application publication with color drawing(s) will be provided by the Office upon request and payment of the necessary fee.

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. Wherein.

DETAILED DESCRIPTION

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

Figure 2:
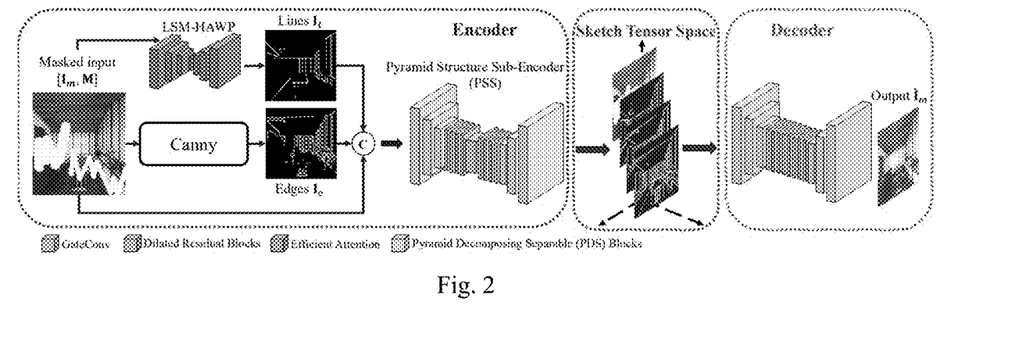
FIG. 2 illustratively shows the overview of MST according to one embodiment of this invention.

FIG. 2 illustratively shows the overview of MST according to one embodiment of our invention, which includes encoder, sketch tensor space, and decoder.

Figure 3:
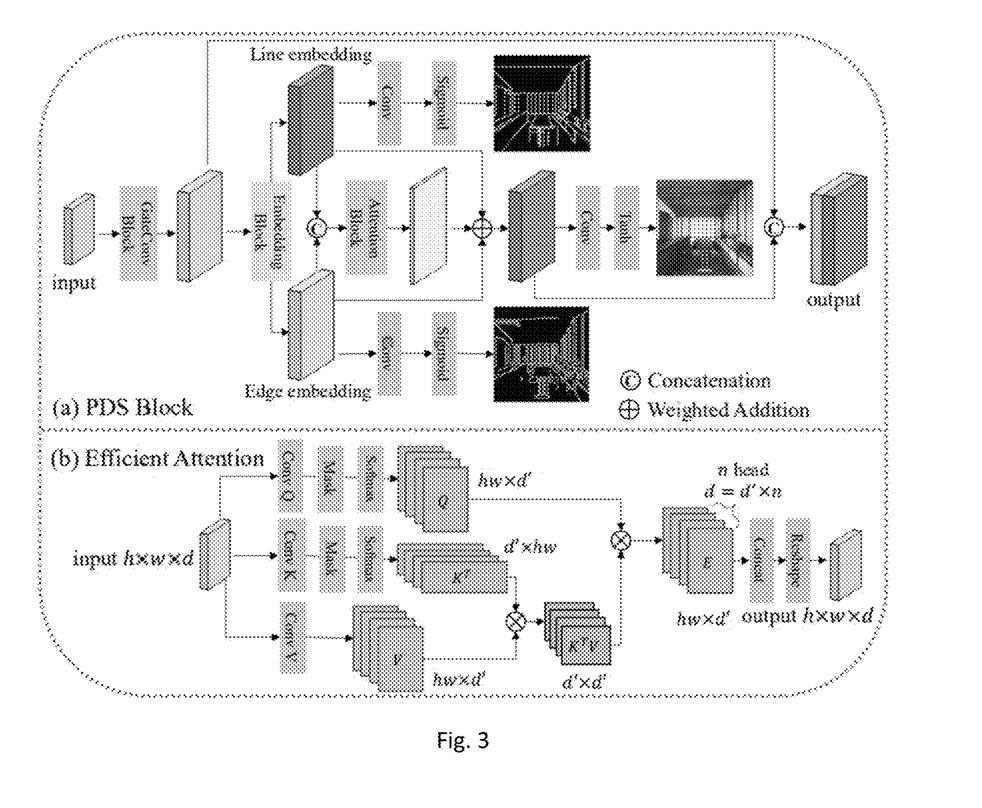
FIG. 3 illustratively shows Pyramid Decomposing Separable (PDS) block (part a), and Efficient Attention block (part b) of the encoder according to one embodiment of this invention.

FIG. 3 illustrative shows Pyramid Decomposing Separable (PDS) block (part a), and Efficient Attention block (part b) of the encoder according to one embodiment of our invention.

As shown in FIG. 2, given the input masked image $I_m \in \mathbb{R}^{h \times \omega \times 3}$ and corresponding binary mask M, MST has three key components, i.e., encoder $\Phi: [I_m, M] \rightarrow S$, decoder $\Psi: S \rightarrow \tilde{I}_m$, and Sketch Tensor (ST) space of a third-order tensor denoted by $S \in \mathbb{R}^{h \times \omega \times 3}$. Particularly, the encoder firstly employs the improved wireframe parser LSM-HAWP and canny detector to extract line $I_l$ and edge maps $I_e$; then the concatenated image and maps $[I_l; I_e; I_m; M]$ is processed by Pyramid Structure Sub-Encoder (PSS) to produce the ST space S. The decoder predicts inpainted image $\tilde{I}_m$, closer to ground-truth image I. The LSM algorithm, the PSS and ST space and the decoder will be discussed in paragraphs below.

The wireframe parser HAWP is adopted to extract lines from images. Specifically, it extracts the junction set $J=\{p=(x,y) \in \mathbb{R}^2\}$, and line set $L=\{1=(p_a, p_b)=(x_a, y_a, x_b, y_b)\}$ paired by junctions in J. Unfortunately, if lines are corrupted by the mask M, the results of naive HAWP will be largely degraded.

To this end, we propose an LSM algorithm to infer missed line segments with the flexible wireframe parsing, which is composed of two parts.

1) Learning an LSM-HAWP network by retraining HAWP with the irregular and object segmentation masks. This not only improves the stability for the corrupted images, but also achieves superior results in trivial wireframe parsing tasks;

2) Introducing an indicator function to denote the masking probability of each line segment l according to the mask M as the post-processing for LSM-HAWP, $$\mathbb{I}(1) = \begin{cases} 1 & \text{if } p_a \in M \text{ and } p_b \in M \\ 0 & \text{if } p_a \notin M \text{ and } p_b \notin M, \\ m & \text{otherwise} \end{cases} \quad (1)$$

where m ($0 \leq m \leq 1$) is a hyper-parameter between 0 and 1, and junction $p \in M$, $p \notin M$ means that p is masked or not.

Figure 4:
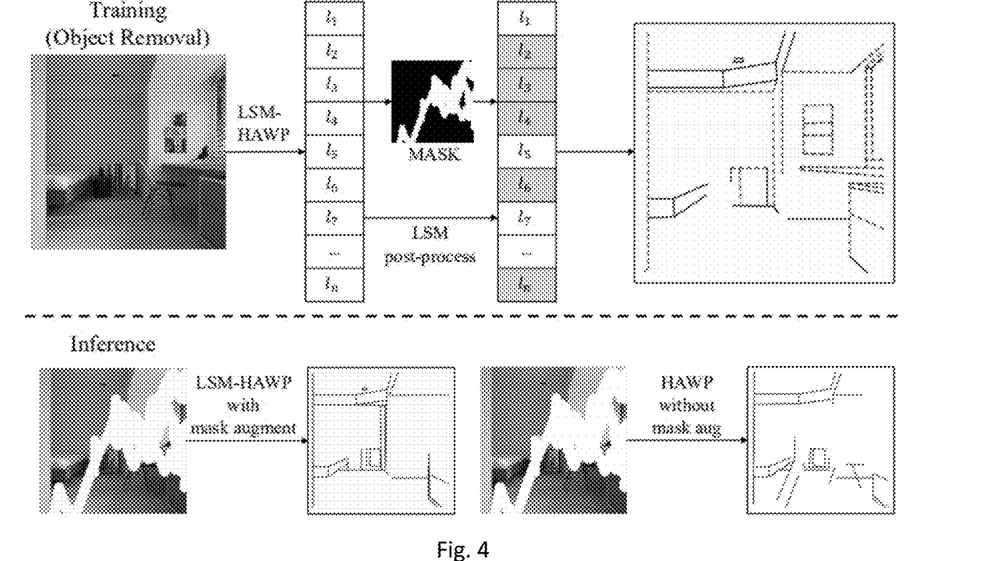
FIG. 4 illustrates the LSM post-process in training and inference stages.

FIG. 4 illustrates the LSM post-process in training and inference stages. Black solid lines, blue and green dotted lines indicate the retained, masked, and masked by probably m lines. Only in inpainting training process or object removal task, the ground-truth images are known in advance. In training, we set m=0.5 to train the first half epoches, and m=1 for training in the rest epoches. In the object removal task, we use the unmasked image with m=0 to retain necessary structures.

Thus as one practical strategy of speedup the learning process, we extract all wireframes beforehand and filtering them by the post-process of LSM, rather than an end-to-end training with LSM-HAWP, which dramatically improves the training efficiency. Note that in the testing stage for inpainting, corrupted images are used as the input to make our results fair comparable to the competitors.

The LSM-HAWP and canny detector extract the line and edge maps $I_l$, $I_e \in \mathbb{R}^{h \times \omega \times 1}$ respectively. Essentially, $I_e$ is binary map, and $I_l$ is got from connecting junction pairs from LSM-HAWP with anti-aliased lines. The input to PSS is the concatenation of the masked image and structure maps $[I_l; I_e; I_m]$. As shown in FIG. 2, the PSS is composed of partially gated convolutions, dilated residual blocks, efficient attention, and pyramid decomposing separable blocks, which will be explained next.

We adopt the Gated Convolution (GC) layers to process the masked input features, as it works well for the irregular mask inpainting tasks in GateConv. Unfortunately, GC demands much more trainable parameters than vanilla convolutions. To this end, as shown in FIG. 2 and part a of FIG. 3, we propose a partially GC strategy of only utilizing three GC layers for the input and output features in both encoder and decoder models. Essentially, this is motivated by our finding that the outputs of GC mostly devoting to filtering features of masked and unmasked regions only in the encoder layers of the coarse network and the decoder layers of the refinement network in GateConv. In contrast, we do not observe significant performance improvement of using GC in the middle layers of backbones. Thus, we maintain vanilla convolutions (i.e., residual blocks) in the middle layers, to save parameters and improve the performance.

Intuitively, attention is important to learn patterns crossing spatial locations in image inpainting. However, attention modules are expensive to be computed, and non-trivial to be parallelized in image inpainting. To this end, we leverage Efficient Attention (EA) module among middle blocks of FIG. 2 and detailed in part b of FIG. 3. Particularly, for the input feature $X \in \mathbb{R}^{h \times \omega \times d}$, and mask $M \in \mathbb{R}^{h \times \omega \times 1}$, we first reshape them to $\mathbb{R}^{h\omega \times d}$ and $\mathbb{R}^{h\omega \times 1}$ as the vector data respectively. Then, the process of efficient attention can be written as $$Q = \mathrm{softmax}_{row}(W_q X + (M \cdot -\infty))$$

$$K = \mathrm{softmax}_{col}(W_k X + (M \cdot -\infty))$$

$$V = W_v X, E = Q(K^T V), \quad (2)$$

where $W_{q,k,v}$ indicates different learned parameter matrices; $+(M \cdot -\infty)$ means masking the corrupted inputs before the softmax operation. Critically, $\mathrm{softmax}_{row}$ and $\mathrm{softmax}_{col}$ means the softmax operations on the row and column individually. Then, we achieve the output $E \in \mathbb{R}^{h\omega \times d}$, which will be reshaped back to $\mathbb{R}^{h \times \omega \times d}$. Note that Eq. (2) is an approximation to vanilla attention operation as in Efficient attention (see Shen et al., "Efficient attention: Attention with linear complexities", *IEEE/CVF Winter Conference on Applications of Computer Vision*, 2021). Typically, this strategy should in principle, reduce significantly computational cost. Since E is computed by $K^T V \in \mathbb{R}^{d \times d}$, rather than standard $QK^T \in \mathbb{R}^{h\omega \times h\omega}$. In practice, the dimension d is much smaller than $h\omega$ in computer vision tasks.

We have found that GAN-based edge inpainting suffers from generating meaningless edges or unreasonable blanks for masked areas, due to the nature of sparsity in binary edge maps. Thus, we propose a novel PDS block in PSS as in part a of FIG. 3. PDS leverages dilated lower-scale structures to make up the sparse problem for ST space. Particularly, assume the image feature $X \in \mathbb{R}^{h \times \omega \times d}$, PDS firstly decouples it as $$E_{le} = f_{eb}(\mathrm{GateConv}(X)), \{E_l, E_e\} = \mathrm{split}(E_{le}),$$

$$O_e = \sigma(\mathrm{Conv}(E_e)), O_l = \sigma(\mathrm{Conv}(E_l)), \quad (3)$$

where $\sigma$ is sigmoid activation. We project the feature into two separated embedding spaces called line embedding $E_l$ and edge embedding $E_e$ with the function $f_{eb}$, which is composed with Conv2D→IN→ReLU. "split" is the operation of splitting the features into two respective tensors with equal channels. Then, $E_l$ and $E_e$ are utilized to learn to roughly reconstruct the image $O_{im}$ without corruption as $$A = f_{ab}(E_{le}) \in \mathbb{R}^{h \times \omega \times 1}$$

$$E_{le}' = E_l \odot (1-A) + E_e \odot A$$

$$O_{im} = \tanh(\mathrm{Conv}(E_{le}')), \quad (4)$$

where $f_{ab}$ is Conv2D→IN→ReLU→Conv2D→Sigmoid. $\odot$ denotes the element-wise product. The prediction of coarse $O_{im}$ gives a stronger constraint to the conflict of $E_l$ and $E_e$, and we expect the attention map A can be learned adaptively according to a challenging target.

Furthermore, a multi-scale strategy is introduced in the PDS. For the given feature $X^{(1)} \in \mathbb{R}^{64 \times 64 \times d}$ from dilated residual blocks of PSS, PDS predicts lines, edges, and coarse images with different resolutions as follow $$X^{(i+1)}, O_{im}^{(i)}, O_l^{(i)}, O_e^{(i)} = \mathrm{PDS}^{(i)}(X^{(i)}), \quad (5)$$

where i=1, 2, 3 indicate that the output maps with 64×64, 128×128, and 256×256 resolutions respectively. Various scales of images can be in favor of reconstructing different types of structure information.

We minimize the objectives of PPS with two spectral norm based SN-PatchGAN (see also Yu et al, "Free-form image inpainting with gated convolution", *IEEE International Conference on Computer Vision*, 2019) discriminators $D_l$ and $D_e$ for lines and edges respectively. And the $\mathcal{L}_D^{enc}$ and $\mathcal{L}_{GG}^{enc}$ are indicated as $$\mathcal{L}_D^{enc} = \mathcal{L}_{D_l} + \mathcal{L}_{D_e}, \quad (6)$$

$$\mathcal{L}_G^{enc} = \lambda_a \mathcal{L}_{adv}^{enc} + \lambda_j \mathcal{L}_{fm} + \sum_{i=1}^{3} \|O_{im}^{(i)} - I^{(i)}\|_1,$$

where $O_{im}^{(i)}$, $I^{(i)}$ are the multi-scale outputs (Eq. 5) and ground-truth images varying image size 64×64 to 256×256 respectively. $\mathcal{L}_{fm}$ is the feature matching loss as in EdgeConnect to restrict the $l_1$ loss between discriminator features from the concatenated coarse-to-fine real and fake sketches discussed below. And the adversarial loss can be further specified as $$\mathcal{L}_{adv}^{enc} = -\mathbb{E}[\log D_l(\hat{O}_l)] - \mathbb{E}[\log D_e(\hat{O}_e)],$$

$$\mathcal{L}_{D_l} = -\mathbb{E}[\log D_l(\hat{I}_l)] - \mathbb{E}[1 - \log D_l(\hat{O}_l)],$$

$$\mathcal{L}_{D_e} = -\mathbb{E}[\log D_e(\hat{I}_e)] - \mathbb{E}[1 - \log D_e(\hat{O}_e)], \quad (7)$$

where $\hat{O}_l$, $\hat{O}_e \in \mathbb{R}^{256 \times 256 \times 3}$ are got from the multi-scale PSS outputs of lines and edges, which are upsampled and concatenated with $\hat{O}_l = [\mathrm{up}(O_l^{(1)}; O_l^{(2)}; O_l^{(3)}]$ and $\hat{O}_e = [\mathrm{up}(O_e^{(1)}; O_e^{(2)}; O_e^{(3)}]$. To unify these outputs into the same scale, the nearest upsampling up( ) is utilized here. Accordingly, $\hat{I}_l$, and $\hat{I}_e$ are the concatenation of multi-scale ground-truth edge and line maps, respectively. Note that, we firstly dilate the ground-truth edges and lines with the 2×2 kernel, and then subsample them to produce the low resolution maps at the scale of 64×64, 128×128. The hyper-parameters are set as $\lambda_a=0.1$, $\lambda_f=10$.

The last outputs $O_l^{(3)}$, $O_e^{(3)} \in \mathbb{R}^{256 \times 256 \times 1}$ of Eq. 5 is used to compose the ST space as $$S=[O_l^{(3)}; O_e^{(3)}; \text{clip}(O_l^{(3)}+O_e^{(3)})]. \qquad (8)$$

Generally, lines represent holistic structures, while edges indicate some local details. They provide priors of structures in different manners to the inpainting model. We also combine and clip them within 0 and 1 to emphasize overlaps and make an intuitive expression of the whole structure.

The structure of the decoder is the same as PSS except that the decoder has no attention blocks and PSD blocks. Because we find that the generator in EdgeConnect is sufficient to generate fine results with reasonable structure information. But we still add gated mechanism to the leading and trailing three convolutions to improve the performance for the irregular mask. As the encoder has provided the ST space $S \in \mathbb{R}^{h \times \omega \times 3}$ in Eq. 8, we can get the inpainted image $\tilde{I}_m$ with the masked input $I_m$ and mask M as $$\tilde{I}_m = \Psi([I_m; M; \mathcal{S}]). \qquad (9)$$

We use SN-PathGAN based discriminator $D_{im}$ for the decoder, and the objectives to be minimized are $$\mathcal{L}_D^{dec} = -\mathbb{E}[\log D_{im}(I)] - \mathbb{E}[1-\log D_{im}(\tilde{I}_m)], \qquad (10)$$

$$\mathcal{L}_G^{dec} = \mathcal{L}_{l_1} + \lambda_a \mathcal{L}_{adv}^{dec} + \lambda_p \mathcal{L}_{per} + \lambda_s \mathcal{L}_{style},$$

$$\mathcal{L}_{adv}^{dec} = -\mathbb{E}[\log D_{im}(\tilde{I}_m)], \qquad (11)$$

where I is the origin undamaged image for training. We adopt the $l_1$ loss $\mathcal{L}_{l_1}$, VGG-19 based perceptual loss (Johnson et al., "Perceptual losses for real-time style transfer and super-resolution", *European conference on computer vision*, 2016) $\mathcal{L}_{per}$, and style-loss (Gatys et al., "Image style transfer using convolutional neural networks", *IEEE conference on computer vision and pattern recognition*, 2016) $\mathcal{L}_{style}$ to train our model, with the empirically set hyperparameters $\lambda_p=0.1$, $\lambda_s=250$. We propose using the balanced loss form (Cui et al, "Class-balanced loss based on effective number of samples", *IEEE/CVF Conference on Computer Vision and Pattern Recognition*, 2019) to implement reconstruction losses $\mathcal{L}_{l_1}$ and $\mathcal{L}_{per}$, normalizing by the weights of masked region M and unmasked region 1−M. The balanced loss form can settle the in-painting task with imbalanced irregular masks properly.

Note that we learn the encoder and the decoder jointly in the forward pass. The gradients of the decoder will not be propagated to update the encoder, which not only saves the memory but also maintains the interpretability of the sketch tensor S. Generally, the total parameter number and calculation costs of our model are comparable to EdgeConnect.

Experiments

In the experiment, the proposed approach is evaluated on three datasets: ShanghaiTech, Places2, and York Urban. ShanghaiTech contains 5000 training images and 462 test images consisted of buildings and indoor scenes with wireframe labels. The LSM-HAWP wireframe detection model is trained on this dataset with the mask augmentation. For Places2, we select 10 categories images according to the number of line segments detected by HAWP as man-made scenes (P2M). Moreover, we randomly select 10 Places2 classes with both natural and urban scenes as comprehensive scenes (P2C). For York Urban, it has 102 city street view images for testing models trained with P2M.

Our method is implemented with PyTorch in 256×256 image size. All models are trained with Adam optimizer of $\beta_1=0$ and $\beta_2=0.9$, and the initial learning rates are 2e−4 and 2e−5 for generators and discriminators respectively. We train the model with 400 k steps in ShanghaiTech and 1000 k steps in Places2. Besides, $E_s$ is trained with ⅓ of the total steps, and then be fixed. We decay the learning rate with 0.75 for each 100 k steps.

For the structure information, line segments are extracted by HAWP, and Canny edges are got with $\sigma=2$. Our model is trained in Pytorch v1.3.1, and costs about 2 days training in ShanghaiTech and about 5 days in Places2 with a single NVIDIA® Tesla® V100 16 GB GPU.

We compare the proposed MST with some known methods, which include Gated Convolution (GC), Edge Connect (EC), Recurrent Feature Reasoning (RFR) (Li et al., "Recurrent feature reasoning for image inpainting", *IEEE/CVF Conference on Computer Vision and Pattern Recognition*, 2020), and Mutual Encoder-Decoder with Feature Equalizations (MED) (Jiang et al, "Rethinking image inpainting via a mutual encoder-decoder with feature equalizations", *European Conference on Computer Vision*, 2020). These methods are all retrained with similar settings and costs compared with ours.

To handle the real-world image inpainting and editing tasks, such as object removal, the random irregular mask generation is adopted in this paper. Besides, as discussed by Zeng et al, ("High-resolution image inpainting with iterative confidence feedback and guided upsampling", *European Conference on Computer Vision*, 2020), real-world inpainting tasks usually remove regions with typical objects or scenes segments. So we collect 91707 diverse semantic segmentation masks with various objects and scenes with the coverage rates in [5%, 40%] from the COCO dataset (Lin et al, "Microsoft coco: Common objects in context", *European conference on computer vision*, 2014). Overall, the final mask will be chosen from irregular masks and COCO segment masks randomly with 50% in both training and test set. To be fair, all comparison methods are retrained with the same masking strategy.

For fair comparisons in image inpainting, we do not leak any line segments of the uncorrupted images for the image inpainting task and related discussions. The wireframe parser LSM-HAWP is trained in ShanghaiTech, and it predicts the line segments for the other two datasets. Besides, results from the object removal with m=0 in Eq. (1) are offered for reference only in this section.

In this section, we evaluate results with PSNR (Peak signal-to-noise ratio), SSIM (Wang et al, "Image quality assessment: from error visibility to structural similarity", *IEEE transactions on image processing*, 2004), and FID (Heusel et al., "Gans trained by a two time-scale update rule converge to a local nash equilibrium", *Advances in neural information processing systems*, 2017). As discussed by Zhang et al. ("The unreasonable effectiveness of deep features as a perceptual metric", *IEEE conference on computer vision and pattern recognition*, 2018), we find that $l_2$ based metrics such as PSNR and SSIM often contradict human judgment. For example, some meaningless blurring areas will cause large perceptual deviations but small $l_2$ loss. Therefore, we pay more attention to the perceptual metric FID in quantitative comparisons.

Table 1 shows the PSNR (P.), SSIM (S.) and FID (F.) results on ShanghaiTech (S.-T.), man-made Places2 (P2M), York Urban (Y.-U.), and comprehensive Places2 (P2C). ↑ means larger is better and ↓ means lower is better. * indicates our method working in object removal mode of LSM. Best results are bold except for object removal ones. From the quantitative results, our method outperforms other approaches in PSNR and FID. Especially for the FID, which accords with the human perception, our method achieves considerable advantages. Besides, our method enjoys good generalization, as it also works properly in P2M, York Urban, and even P2C.

TABLE 1

|  |  | GC | EC | RFR | MED | Ours | Ours* |
|---|---|---|---|---|---|---|---|
| S.-T. | P.↑ | 25.54 | 26.51 | 26.30 | 26.14 | 26.90 | 27.20 |
|  | S.↑ | 0.893 | 0.871 | 0.863 | 0.886 | 0.876 | 0.880 |
|  | F.↓ | 26.06 | 24.84 | 25.95 | 30.02 | 21.16 | 20.05 |
| P2M | P.↑ | 25.72 | 26.71 | 26.07 | 23.84 | 27.20 | 27.47 |
|  | S.↑ | 0.892 | 0.901 | 0.890 | 0.857 | 0.907 | 0.910 |
|  | F.↓ | 16.54 | 14.75 | 17.79 | 26.95 | 12.81 | 12.13 |
| Y.-U. | P.↑ | 25.92 | 26.13 | 25.64 | 24.20 | 26.29 | 26.59 |
|  | S.↑ | 0.886 | 0.864 | 0.852 | 0.858 | 0.869 | 0.872 |
|  | F.↓ | 31.68 | 32.06 | 38.70 | 51.71 | 29.15 | 26.53 |
| P2C | P.↑ | 27.87 | 28.35 | — | — | 28.52 | 28.65 |
|  | S.↑ | 0.923 | 0.927 | — | — | 0.928 | 0.929 |
|  | F.↓ | 15.05 | 13.68 | — | — | 11.97 | 11.69 |

Figure 5:
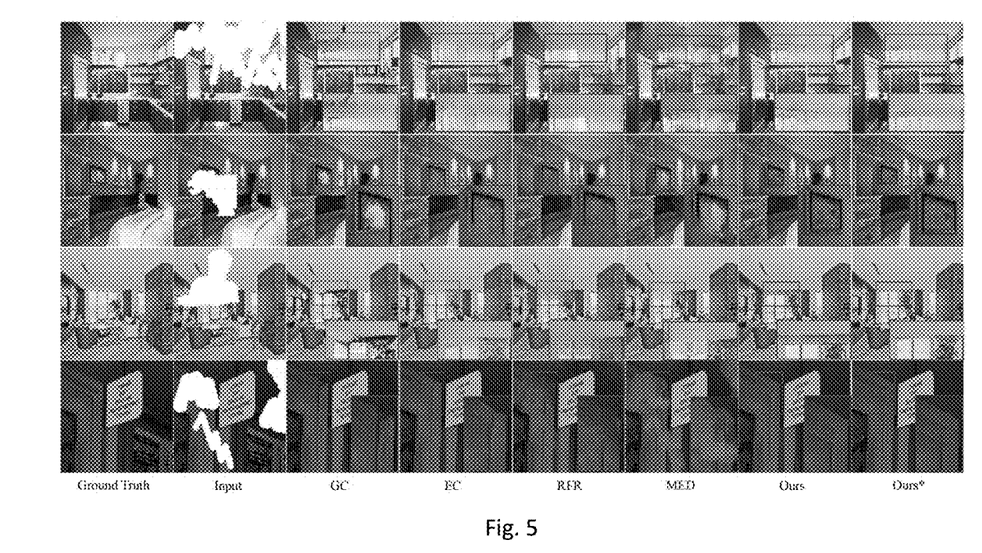
FIG. 5 illustratively shows the qualitative results among the method of this application and other methods.

FIG. 5 illustratively shows the qualitative results among our method and other methods like ShanghaiTech and man-made Places2, where * means that our method works in the LMS object removal mode with m=0. Key parts are enlarged. Compared with other methods, our approach achieves more semantically coherent results. From the enlarged regions, our schema significantly outperforms other approaches in preserving the perspectivity and the structures of man-made scenes.

Figure 6:
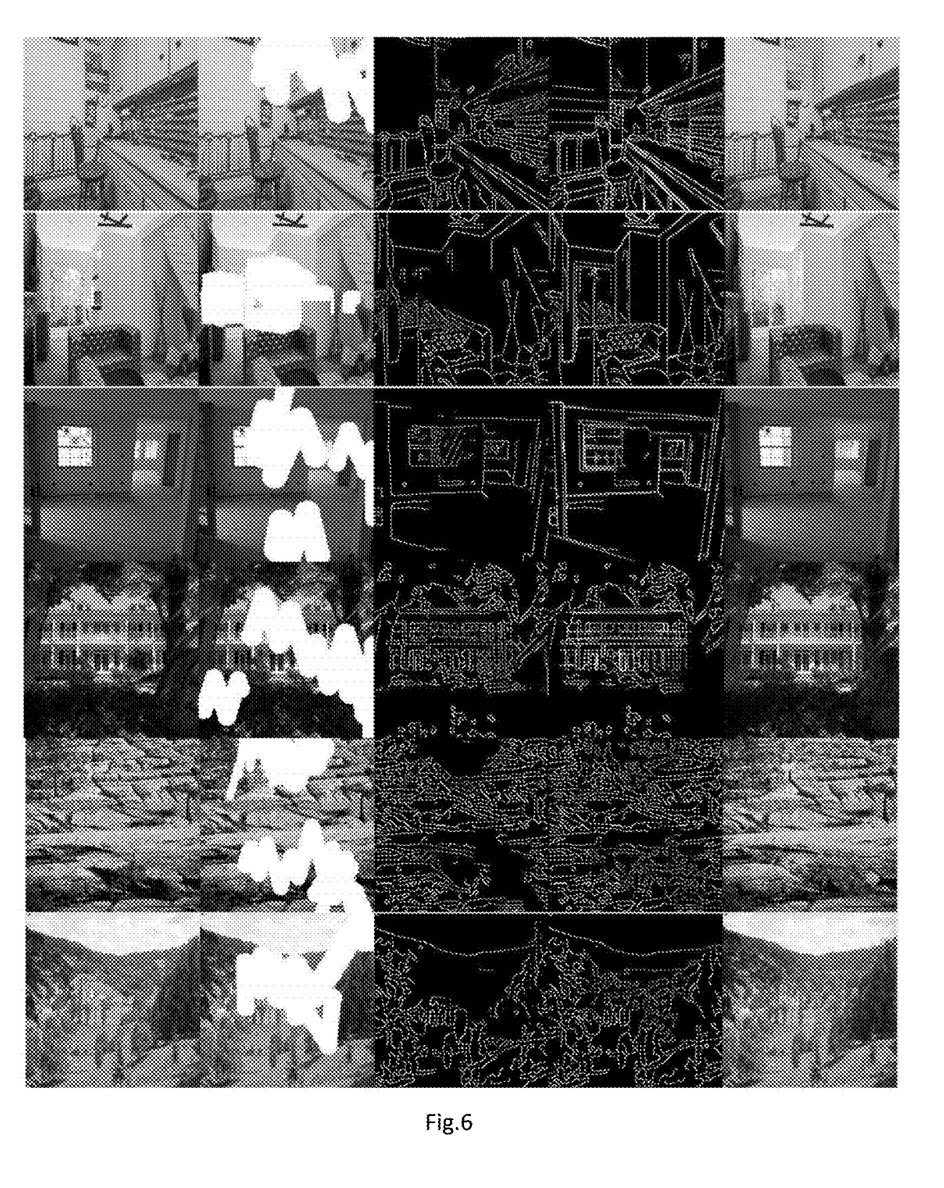
FIG. 6 illustratively shows the edge results of EC and partial sketch tensor space (edges and lines) results of the method of this invention in ShanghaiTech, P2M, and P2C.

Moreover, FIG. 6 shows the edge results of EC and partial sketch tensor space (edges and lines) results of our method in ShanghaiTech, P2M, and P2C. From left to right it shows original image, masked image, edges $O_e$ generated from EC, edges and lines clip($O_l+O_e$) generated from our model, our inpainted results. Blue lines indicate the generated lines or edges. Results in FIG. 6 demonstrate that line segments can supply compositional information to avoid indecisive and meaningless generations in edges. Furthermore, line segments can also provide clear and specific structures in masked regions to reconstruct more definitive results in man-made scenes. Besides, for the natural scene images in P2C without any lines, our method can still outperform EC with reasonable generated edges for the masked regions. As discussed, the proposed PDS works properly to handle the sparse generative problem In the last three rows of Tab. 1, we present the results of ours method on the comprehensive Places2 dataset (P2C) to confirm the generalization. They are compared with GC and EC, which have achieved fine scores in man-made Places2 (P2M). Note that all metrics are improved in P2C compared with ones in P2M of Tab. 1, which demonstrates man-made scenes are more difficult to tackle. Our methods still get the best results among all competitors, and the object removal results achieve superior performance. Besides, the last two rows of FIG. 6 show that our method can generate reliable edge sketches even with-out lines in natural scenes. These phenomenons are largely due to two reasons:

1) There is still a considerable quantity of line segments in the comprehensive scenes, and these in-stances are usually more difficult than others.

2) The pro-posed partially gated convolutions, efficient attention, and PDS blocks can work properly for various scenes.

For more comprehensive comparisons, 50 inpainted images from GC, EC, and ours are chosen from ShanghaiTech and P2M randomly. And these samples are compared by 3 uncorrelated volunteers. Particularly, volunteers need to choose the best one from the mixed pool of the inpainted images with different methods, and give one score to the respective approach. If all methods work roughly the same for a certain sample, it will be ignored. Average user scores of ShanghaiTech (S.-T.) and man-made Places2 (P2M) are shown in Tab. 2. Ours method is significantly better than other competitors.

TABLE 2

|  | GC | EC | Ours |
|---|---|---|---|
| S.-T. | 3.00 | 7.67 | 33.67 |
| P2M | 6.67 | 8.67 | 32.33 |

From the last column in FIG. 5, we show the inpainting results of our MST working in the post-process of LSM with m=0 for the object removal. These refined images with more reasonable structures indicate that our model can strengthen the capability of image reconstruction without redundant residues.

Figure 7:
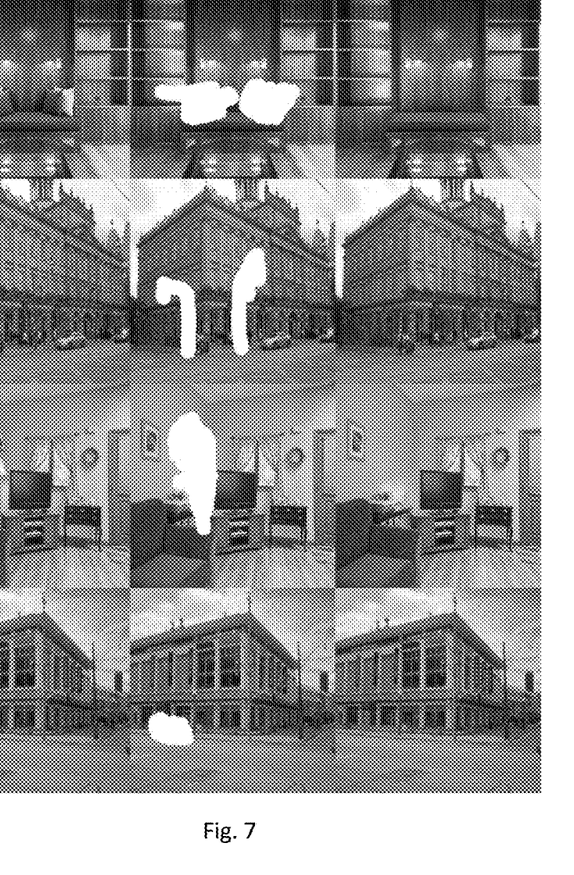
FIG. 7 shows some object removal cases.

FIG. 7 shows some object removal cases, to confirm the practicability of the proposed method. From left to right it shows origin image, masked image, and our inpainted image. Numerical results are presented in the last columns of Tab. 1. So, our method can achieve further improvements in all metrics compared with the vanilla image inpainting schema for the object removal, and it can correctly mask undesired lines. Therefore, the post-process of LSM can significantly improve the performance in the object removal task with the separability of line segments.

As discussed, we retrain the HAWP with mask augmentation to ensure the robustness for the corrupted data as LSM-HAWP in ShanghaiTech dataset. To confirm the effect of the augmentation, we further prepare another masked ShanghaiTech test-set with the same images. The results are shown in Tab. 3, including Structural average precision scores (see also "End-to-end wireframe parsing") with different thresholds of parsers trained with (LSM-HAWP) and without (HAWP) the mask augmentation on ShanghaiTech.

TABLE 3

|  | unmasked testset | | | masked testset | | |
|---|---|---|---|---|---|---|
|  | Threshold | | | | | |
|  | 5 | 10 | 15 | 5 | 10 | 15 |
| HAWP | 62.16 | 65.94 | 67.64 | 35.39 | 38.47 | 40.15 |
| LSM-HAWP | 63.20 | 67.06 | 68.70 | 48.93 | 53.30 | 55.39 |

The structural average precision (sAP) metric is defined as the area under the PR curve of detected lines with different thresholds. From Tab. 3, LSM-HAWP performs better than vanilla HAWP significantly for the masked testset. Moreover, HAWP can also gain improvements in the uncorrupted testset with more than 1% in sAP, which indicates the great generality of the mask augmentation for the wireframe detection task.

The related ablation study of gated convolution (GC) are shown in Tab. 4. Param indicates the parameter scale of the compared inpainting model. Only replacing vanilla convolutions for input and output stages of the model with partially GC gains satisfactory improvements. But replacing all convolution layers with GC fails to achieve a further large advance, while the parameters are doubled.

TABLE 4

|  | PSNR↑ | SSIM↑ | FID↓ | Param |
| --- | --- | --- | --- | --- |
| w/o GC | 26.51 | 0.871 | 24.84 | 10.8M |
| Partially GC | 26.78 | 0.874 | 22.68 | 12.1M |
| All GC | 26.71 | 0.874 | 22.62 | 25.1M |

We explored the effects of lines, Pyramid Decomposing Separable (PDS) blocks and the Efficient Attention (EA) module in Tab. 5 in ShanghaiTech. Specifically, line segments, PDS blocks and the EA module are removed respectively, while other settings unchanged.

TABLE 5

|  | w/o lines | w/o EA | w/o PDS | Ours |
| --- | --- | --- | --- | --- |
| PSNR↑ | 26.78 | 26.77 | 26.63 | 26.90 |
| SSIM↑ | 0.874 | 0.875 | 0.873 | 0.876 |
| FID↓ | 22.68 | 21.39 | 21.88 | 21.16 |

Figure 8:
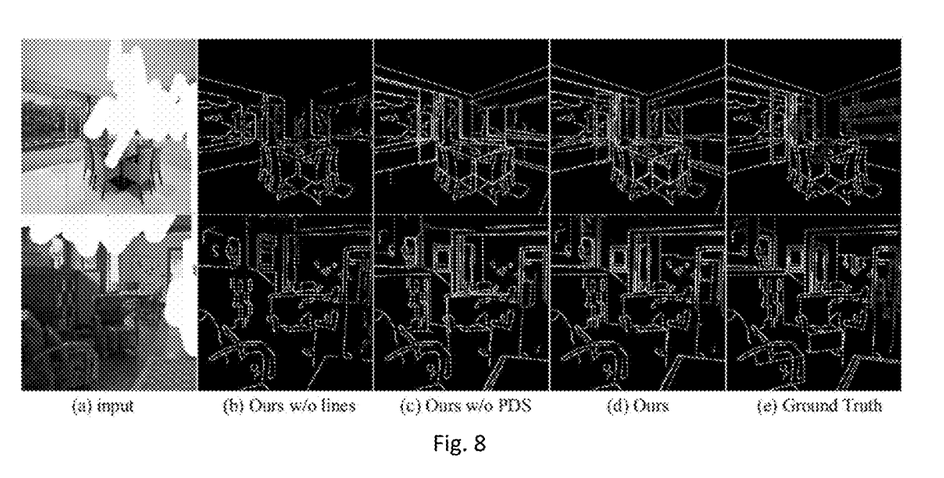
FIG. 8 shows the results of ablation studies on line segments and PDS blocks in ShanghaiTech.

FIG. 8 shows the results of ablation studies on line segments and PDS blocks in ShanghaiTech. Blue and red lines indicate recovered and ground truth in masked regions, respectively. As shown in FIG. 8, our method without line segments causes severe structural loss, and the one without PDS suffers from contradictory perspectivity. From Tab. 5, we can see all line segments, PDS blocks and the EA module can improve the performance in image inpainting.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A system for image inpainting, comprising an encoder, a decoder, and a sketch tensor space of a third-order tensor; wherein:
the encoder includes a wireframe parser and a canny detector, and a pyramid structure sub-encoder;
the wireframe parser is used to extract line maps from an original image input to the encoder, the canny detector is used to extract edge maps from the original image, and the pyramid structure sub-encoder is used to generate the sketch tensor space based on the original image, the line maps and the edge maps; and
the decoder outputs an inpainted image from the sketch tensor space.

2. The system of claim 1, wherein the wireframe parser extracts a junction set and a line set paired by junctions of the junction set.

3. The system of claim 1, wherein the lines are corrupted by a mask, and a line segment masking (LSM) algorithm is used to infer missed line segments with a flexible wireframe parsing.

4. The system of claim 3, wherein the flexible wireframe parsing comprises learning an LSM-HAWP network by retraining holistically attracted wireframe parsing (HAWP) with irregular and object segmentation masks, and introducing an indicator function to denote a masking probability of each line segment according to the mask as the post-processing of LSM-HAWP.

5. The system of claim 4, wherein during post-processing of LSM-HAWP, only in inpainting training process or object removal task, the ground-truth images are known in advance.

6. The system of claim 5, wherein all wireframes are extracted beforehand and filtered by the post-process of LSM-HAWP, rather than an end-to-end training with LSM-HAWP.

7. The system of claim 4, wherein line maps are got from connecting junction pairs from LSM-HAWP with anti-aliased lines.

8. The system of claim 1, wherein edge maps are binary maps.

9. The system of claim 1, wherein the pyramid structure sub-encoder includes partially gated convolutions blocks, dilated residual blocks, an attention block, and pyramid decomposing separable blocks.

10. The system of claim 9, wherein in the partially gated convolutions (GC) blocks only three GC layers are used for the input and output features in both upsampling and downsampling parts.

11. The system of claim 9, wherein the attention block is in the middle of a pyramid structure sub-encoder.

12. The system of claim 9, wherein the pyramid decomposing separable blocks leverages dilated lower-scale structures.

13. The system of claim 9, wherein the pyramid decomposing separable blocks project the image feature into two separated embedding spaces; one is a line embedding space and the other is an edge embedding space.

14. The system of claim 1, wherein the decoder includes partially gated convolutions blocks, dilated residual blocks, without attention blocks or pyramid decomposing separable blocks.

15. A method for image inpainting with an encoder, a decoder, and a sketch tensor space of a third-order tensor, wherein the encoder has a wireframe parser, canny detector, and a pyramid structure sub-encoder, the method comprising:
extracting line maps from an original image input to the encoder with the wireframe parser;
extracting edge maps from the original image with the canny detector;
generating a sketch tensor space with the pyramid structure sub-encoder based on the original image, the line maps and the edge maps; and
outputting with the decoder an inpainted image from the sketch tensor space.

* * * * *